Dec. 27, 1966     J. F. COPLIN     3,294,366

BLADES FOR GAS TURBINE ENGINES

Filed Jan. 20, 1966

INVENTOR

John Frederick Coplin

BY

Cushman, Darby & Cushman

ATTORNEYS

United States Patent Office 3,294,366
Patented Dec. 27, 1966

3,294,366
BLADES FOR GAS TURBINE ENGINES
John Frederick Coplin, Derby, England, assignor to Rolls-Royce Limited, Derby, England, a British company
Filed Jan. 20, 1966, Ser. No. 521,954
Claims priority, application Great Britain, Apr. 20, 1965, 16,677/65
2 Claims. (Cl. 253—77)

This invention relates to rotor blades and/or stator blades for gas turbine engines.

According to the present invention, there is provided an axial flow compressor rotor blade or stator blade which is of aerofoil shape in cross-section and comprises a metal portion and a portion of thermosetting plastic material bonded together, the metal portion comprising at least the leading and trailing edges of the blade, whilst the plastic portion comprises at least one flank of the blade.

Preferably the leading and trailing edges of the blade are interconnected by a further metal portion.

The further metal portion may form one flank of the blade.

In a preferred embodiment of the invention, the said metal portion is adapted to form the root portion of the blade.

In a further preferred embodiment, though not restricted to it, the said root portion is curved in shape at its extremity, to permit fixing to a rotor disc, the outer periphery of which has been scalloped to prevent hoop stress crack propagation.

The invention will now be described, by way of example only, with reference to the accompanying drawings in which:

FIGURE 1 is a diagrammatic view of a gas turbine engine of the type referred to;

Figure 1:
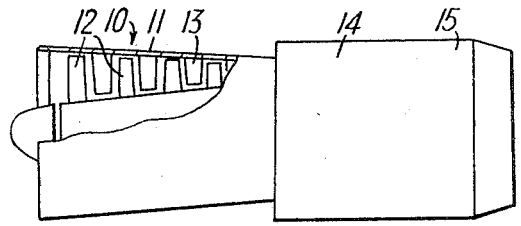

In FIGURE 1 there is shown a gas turbine engine 10, having a compressor 11, comprising rotor blades 12 and stator blades 13. In flow series with compressor 11 is combustion equipment 14 and turbine 15.

Figure 2:
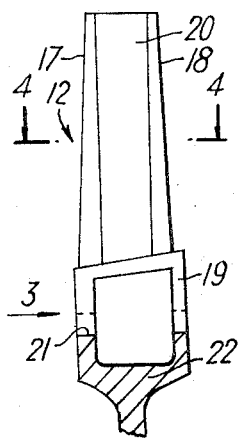
FIGURE 2 is a rotor blade shown in side elevation.
Figure 4:
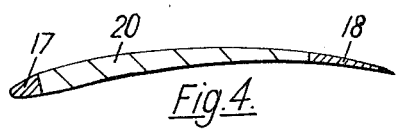
FIGURE 4 is a section through the rotor blade on line 4—4 showing one arrangement of the metal and plastic.

In FIGURES 2 and 4 the rotor blade 12 comprises a metal leading edge 17 and a metal trailing edge 18, the two being joined at their lower extremities as viewed in FIGURE 2, by a metal root portion 19. Lying between, and bonded to leading and trailing edges 17–18 is a plastic flank portion 20. Root portion 19 is fixed, by welding or other means in scallops 21 of rotor disc 22.

Figure 3:
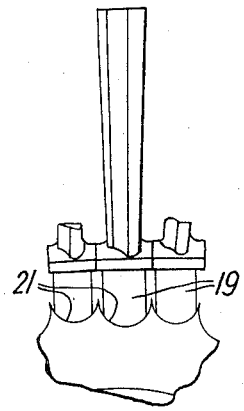
FIGURE 3 is a view in the direction of arrow 3 of FIGURE 2.

In FIGURE 3 the fitting of the blade to the disc is shown more clearly.

Figure 5:
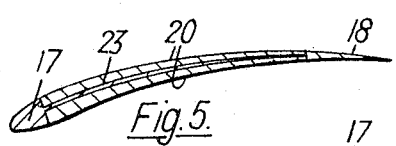
FIGURE 5 is an alternative arrangement of the metal and plastic.
Figure 6:
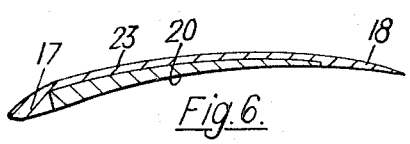
FIGURE 6 is a further alternative arrangement of the metal and plastic.

FIGURES 5 and 6 are sections similar to FIGURE 4, but in these arrangements, the leading and trailing edges 17–18 are interconnected by a further metal portion 23.

I claim:

1. In combination: a plurality of rotor blades and an axial flow compressor disc for a gas turbine engine, each of said rotor blades comprising an aerofoil part including metal portions and thermosetting plastic portions bonded to each other to form a rigid unit, said metal portions of each of said blades being extended to form a root portion having a radially inner end of a convex arcuate profile, said compressor disc having a corresponding number of concave arcuate depressions in its rim complementary to the convex arcuate profile of the inner end of the root portions of each of said blades, and means of integrally securing the inner end of the root portions of each of said blades in one of the depressions in the rim of said compressor disc.

2. The combination in claim 1 in which said bonding means includes a weld between the root portions of each of said blades and the depressions in said disc to which the root portion is fitted.

References Cited by the Examiner

UNITED STATES PATENTS

| 2,644,296 | 7/1953 | Sanz. |
| 2,648,390 | 8/1953 | La Gabbe. |
| 2,708,081 | 5/1955 | Dobson _____ 170—159 X |

FOREIGN PATENTS

| 660,007 | 10/1951 | Great Britain. |
| 903,124 | 8/1962 | Great Britain. |
| 914,548 | 1/1963 | Great Britain. |

EDGAR W. GEOGHEGAN, Primary Examiner.

EVERETTE A. POWELL, JR., Examiner.